G. M. COOK.
HORSE COLLAR.
APPLICATION FILED SEPT. 3, 1914.

1,190,116.

Patented July 4, 1916.

Witnesses
J. P. Nahler.
J. F. Byrne.

Inventor
G. M. Cook.
By ___ Attorney

UNITED STATES PATENT OFFICE.

GUY MARION COOK, OF ROCHESTER, NEVADA.

HORSE-COLLAR.

1,190,116. Specification of Letters Patent. Patented July 4, 1916.

Application filed September 3, 1914. Serial No. 860,061.

*To all whom it may concern:*

Be it known that I, GUY MARION COOK, a citizen of the United States, residing at Rochester, in the county of Humboldt and State of Nevada, have invented certain new and useful Improvements in Horse-Collars, of which the following is a specification.

This invention is directed to improvements in horse collars, and one of its objects is the provision of a device of this kind wherein the afterwales are provided with pneumatic cushions adapted to distribute the draft of the collar equally over the horse's withers, the invention comprehending a metal forewale, a hollow afterwale consisting of a rigid outer wall and a flexible inner wall, and an air cushion located in the afterwale.

A further object of the invention is the provision of a horse collar of the above stated character which shall be strong, durable and efficient and which may be manufactured and sold at a comparatively low cost.

Figure 1:
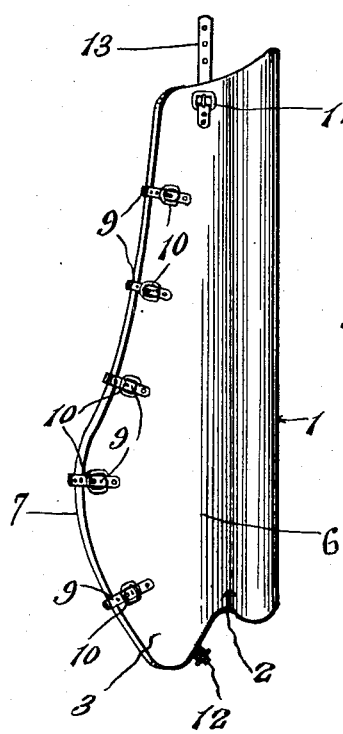
Figure 2:
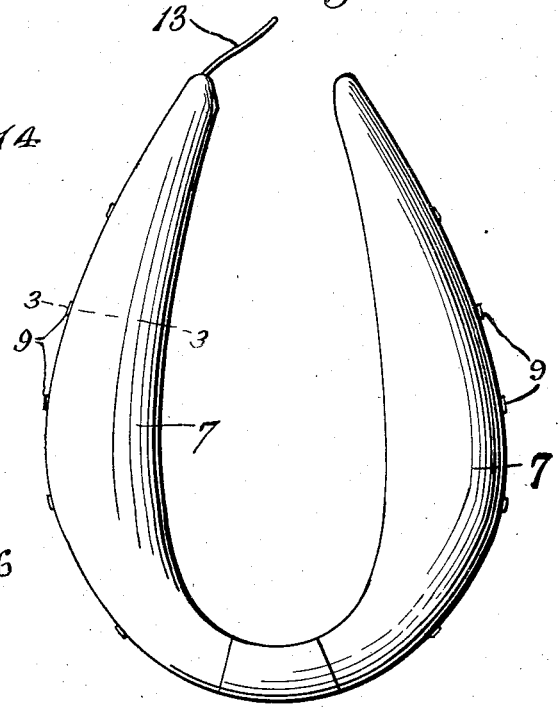
Figure 3:
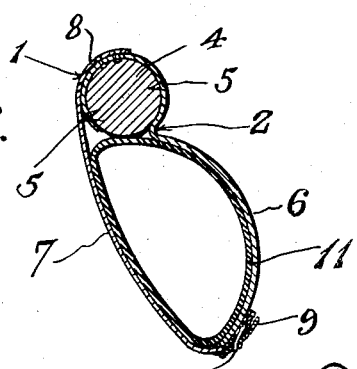

With the above and other objects in view, the invention consists in the construction, combination and arrangement of parts hereinafter fully described and claimed and illustrated in the accompanying drawing, wherein, Figure 1 is a view in side elevation of a horse collar constructed in accordance with my invention. Fig. 2 is a view in rear elevation of a horse collar. Fig. 3 is a sectional view taken on the horizontal plane indicated by the line 3—3 of Fig. 2.

Referring to the drawings by reference numerals 1 designates the forewale, 2 the hame crease and 3 the afterwale of my improved horse collar.

The forewale 1 comprises a hollow metal member of substantially circular configuration in cross section, the same being reinforced and strengthened by a filler of wood 4. The filler 4 is secured in place by screws 5, which also retain the metal member in proper formation.

The afterwale 3 is also hollow and it is of substantially elliptical form in cross section. It comprises a rigid outer wall 6 and a flexible inner wall 7, the outer wall 6 forming an extension of the forewale 1. At their juncture the forewale 1 and the wall 6 are formed to provide the hame crease 2. The flexible wall 7 is preferably constructed of leather, and it is permanently attached to the forewale 1, as at 8, the opposite edge thereof having a detachable and adjustable construction with the front wall 6. This detachable and adjustable connection is established through the medium of straps 9 and buckles 10, the straps being carried by the walls 7 and the buckles by the walls 6.

An elastic tube 11 is inserted in each of the afterwales 3 and they are adapted to be inflated through the medium of a suitable pump and valves 12, one only of the valves being shown. At its upper end the collar is provided with the usual strap 13 and buckle 14.

As each of the afterwales 3 is provided with an air cushion, the draft on the collar will be equally distributed over the horse's withers. The flexible inner walls 7 permit the air cushions to conform to the configuration of the horse's withers. The air cushions 11 also take up and dissipate all shocks applied to the collar usually resulting from the wheels of the vehicle striking rocks and other irregular surfaces in the roadway and from the initial pulling movement of the horse. As the inner walls 7 are flexible and as their outer edges are detachably connected to a front plate 6, the air tubes 11 may be readily and quickly applied and removed.

It should be apparent from the above description taken in connection with the accompanying drawing that I provide a pneumatic horse collar which is simple, durable and efficient and which may be manufactured and sold at a comparatively low cost.

In practice, I have found that the form of my invention, illustrated in the drawing, and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to when required, without sacrificing any of the advantages of my invention, as set forth.

Having thus described the invention what is claimed as new, is:

A horse collar comprising a metal shell having its ends overlapping and connected together and bent to form a substantially large after-wale approximately elliptical in cross section, also further bent to form a fore-wale approximately annular in cross section, a wood filler secured in said fore-wale and reinforcing the same, a flexible lining secured to the inner walls of said after-wale, and an air tube positioned in and secured to said flexible lining, one face of said shell being creased substantially at the point of juncture of the fore-wale and after-wale and forming a groove adapted to receive the hame therein when in use.

In testimony whereof I affix my signature in presence of two witnesses.

GUY MARION COOK.

Witnesses:
ALFRED STRAND,
S. E. HACKLEY.

Copies of this patent may be obtained for five cents each, by addressing the "Commissioner of Patents, Washington, D. C."